«12» United States Patent
White et al.

«10» Patent No.: US 10,651,686 B2
«45» Date of Patent: May 12, 2020

«54» FLUX-ENHANCED ENERGY HARVESTING FROM CURRENT-CARRYING CONDUCTORS

«71» Applicant: THE REGENTS OF THE UNIVERSITY OF CALIFORNIA, Oakland, CA (US)

«72» Inventors: Richard M. White, Berkeley, CA (US); Zhiwei Wu, Berkeley, CA (US)

«73» Assignee: The Regents of the University of California, Oakland, CA (US)

«*» Notice: Subject to any disclaimer, the term of this patent is extended or adjusted under 35 U.S.C. 154(b) by 422 days.

«21» Appl. No.: 15/668,479

«22» Filed: Aug. 3, 2017

«65» Prior Publication Data

US 2018/0048187 A1  Feb. 15, 2018

Related U.S. Application Data

«60» Provisional application No. 62/370,540, filed on Aug. 3, 2016.

«51» Int. Cl.
*H02J 50/12* (2016.01)
*H02J 7/04* (2006.01)
(Continued)

«52» U.S. Cl.
CPC ............. *H02J 50/12* (2016.02); *H01F 38/14* (2013.01); *H02J 7/025* (2013.01); *H02J 7/04* (2013.01);
(Continued)

«58» Field of Classification Search
CPC . H02J 5/005; H02J 7/025; H02J 17/00; H04B 5/0025–0093; B60L 11/182;
(Continued)

«56» References Cited

U.S. PATENT DOCUMENTS

| 4,904,996 A | * | 2/1990 | Fernandes | ............ | G01R 15/142 |
| | | | | | 340/601 |
| 5,528,113 A | * | 6/1996 | Boys | ....................... | B60L 53/32 |
| | | | | | 318/16 |

(Continued)

*Primary Examiner* — Rexford N Barnie
*Assistant Examiner* — Terrence R Willoughby
«74» *Attorney, Agent, or Firm* — O'Banion & Ritchey LLP; John P. O'Banion

«57» ABSTRACT

An apparatus for harvesting power from a current carrying conductor without electrically contacting the conductor is provided. The apparatus employs a coil with core and flux concentrators of high magnetic permeability steel that redirect the time-varying magnetic flux of the conductor to interact more strongly with the coil, and increase the coil's output voltage and power. A voltage converter may be used with a DC voltage output that can continually charge batteries or supercapacitors as well as provide energy for sensors, accelerometers, long-range radios to transmit data on local powerline conditions, and LEDs and buzzers. The apparatus may also have powered environmental sensors for measuring the concentrations of airborne particulate matter such as diesel exhaust and smoke, as well as toxic gases, greenhouse gases, allergenic pollens etc. The apparatus has a housing that is oriented and coupled to the conductor with a coupling.

19 Claims, 6 Drawing Sheets

(51) Int. Cl.
*H02J 7/02* (2016.01)
*H01F 38/14* (2006.01)
*H04B 3/54* (2006.01)
*H04B 1/02* (2006.01)
*H01F 38/28* (2006.01)

(52) U.S. Cl.
CPC ............... *H01F 38/28* (2013.01); *H04B 1/02* (2013.01); *H04B 3/54* (2013.01)

(58) Field of Classification Search
CPC .... B60L 11/1829; Y02T 90/122; H01F 38/14; H01F 2038/143–146
See application file for complete search history.

(56) References Cited

U.S. PATENT DOCUMENTS

| | | | | |
|---|---|---|---|---|
| 6,483,202 B1* | 11/2002 | Boys | ................ | B60L 5/005 |
| | | | | 307/17 |
| 2010/0084920 A1* | 4/2010 | Banting | ............... | G01R 15/142 |
| | | | | 307/66 |
| 2012/0039061 A1* | 2/2012 | McBee | .................. | H01F 27/06 |
| | | | | 361/825 |
| 2016/0209445 A1* | 7/2016 | McCammon | ........ | G01R 31/021 |
| 2016/0225520 A1* | 8/2016 | Miron | .................... | H01F 38/30 |
| 2016/0276954 A1* | 9/2016 | Vos | ......................... | H01F 38/14 |
| 2016/0294448 A1* | 10/2016 | Cano Rodriguez | ..... | H01F 27/24 |
| 2017/0199229 A1* | 7/2017 | King | ..................... | G01R 15/18 |

* cited by examiner

FLUX-ENHANCED ENERGY HARVESTING FROM CURRENT-CARRYING CONDUCTORS

CROSS-REFERENCE TO RELATED APPLICATIONS

This application claims priority to, and the benefit of, U.S. provisional patent application Ser. No. 62/370,540 filed on Aug. 3, 2016, incorporated herein by reference in its entirety.

STATEMENT REGARDING FEDERALLY SPONSORED RESEARCH OR DEVELOPMENT

This invention was made with Government support under Contract Number D15PC00109 awarded by the Department of Homeland Security. The government has certain rights in the invention.

INCORPORATION-BY-REFERENCE OF COMPUTER PROGRAM APPENDIX

Not Applicable

BACKGROUND

1. Technical Field

The technology of this disclosure pertains generally to devices and methods for passive electricity generation and more particularly to an apparatus and methods for harvesting electrical energy from energized conductors carrying alternating currents, such as those on overhead and underground power lines and power-supplying conductors in offices and dwellings. A primary function of the harvester is to obtain enough power to supply wireless communication devices, energy storage batteries and capacitors, and sensors such as accelerometers, particulate matter measuring devices, and atmospheric sensors that measure concentrations of toxic gases and other substances.

2. Background Discussion

High-voltage transmission power lines are used to provide electrical power from the point of generation to the point of distribution and consumption. Regional electrical power grids typically have a variety of sources of generation such as thermal power, photovoltaic power, hydropower, tidal power and wind generation. Transmission lines often cross forests, mountains, rivers and other areas that are inaccessible.

There are an estimated 130 million wooden poles in the United States that support overhead power lines. The power lines could be damaged by storms or sabotage, and the importance of maintaining continuity of power supply to homes, businesses and critical care facilities, for example, necessitates organizing the repair process so as to fix the most important power circuits first.

Devices for monitoring of network load distribution, power line voltage and power line current are useful maintaining a power line distribution system. These devices and other devices on power lines such as communication repeaters require power to operate. Conventional power source for these devices involve the use of batteries, solar cells, or power transformers.

However, these power sources are short term, expensive and often unreliable. For example, batteries have limited life and cannot provide the ongoing power required for most devices. Solar panels can charge batteries but are often limited by weather and durability in long term settings. While power transformers are reliable, they are very expensive, draw power from the lines and provide power far exceeding the requirements of the devices.

Accordingly, a need exists for an inexpensive, reliable and perpetual power source for a device on an electrical power line. In particular, it would be useful to have an inexpensive means for coupling enough energy from individual conductors of overhead power distribution lines to provide means for measuring (with various sensors) and reporting (with miniature radio transmitters) the conditions of the overhead power distribution lines.

BRIEF SUMMARY

The present technology provides an apparatus for perpetually capturing energy via magnetic flux from a power-line conductor that can be used to operate sensors, transmitters, energy storage batteries and capacitors and other devices. The technology is capable of harvesting energy that can be stored in rechargeable batteries or supercapacitors. The energy harvesting technology that provides an inexpensive means for coupling enough energy from individual conductors of overhead power distribution lines to provide means for measuring the condition of overhead power distribution lines with various sensors and for reporting sensor data with miniature radio transmitters. For example the apparatus can power sensors such as accelerometers that detect when a pole has fallen and putting the lines that it supports out of commission.

Additional types of sensors that might be used are sensors for power-line current, gases such as ozone, nitrous oxides and carbon dioxide, and concentrations of airborne particulate matter. In addition to broadcasting to a remote database, the package could broadcast the data to people walking nearby so that the pollution levels would appear on their ordinary cell phones.

For these applications, the harvested electric power should be at least few milliwatts and the DC output voltage for battery charging should be about 5 volts. The technology described herein is relatively compact (volume of a few cubic centimeters), is easily installable, is inexpensive, and operates without creating audible noise. The technology also may be capable of functioning unattended for 10 years or more.

The apparatus is a coil-based with one or more very thin sheets of high magnetic permeability steel encasing the coil that help direct into the coils the time-varying magnetic flux produced by the AC current flowing in the conductor line. The steel sheets are flux concentrators that redirect the magnetic flux to interact more strongly with the coil, and so increase the coil's output voltage and power. The coil also has a core of laminated sheets. These sheets can also be coated with a weatherproofing polymeric material if needed.

An interesting characteristic of magnetic materials is that they usually have a maximum magnetic field at which their magnetic properties saturate and they fail to behave properly. It is possible to use this effect to prevent the occurrence of damaging current spikes in the harvester and related sensors caused by high magnetic fields due to sudden high currents produced by lightning strikes on the power lines. The reason is that the high magnetic fields associated with the current strikes might cause saturation of the harvester's magnetic properties, reducing the harvester's output temporarily and so protecting the associated circuitry from being damaged.

In one embodiment, a commercial DC-DC converter integrated circuit whose input is the AC voltage from the flux-enhanced coil and whose output is a DC voltage used to continually charge batteries or supercapacitors whose stored energy supplies accelerometers, long-range radios to transmit data on local powerline conditions, and LEDs and buzzers that indicate local line conditions visually and audibly, and perhaps even power local Wi-Fi equipment.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWINGS

The technology described herein will be more fully understood by reference to the following drawings which are for illustrative purposes only.

DETAILED DESCRIPTION

Referring more specifically to the drawings, for illustrative purposes, embodiments of an overhead power line energy harvesting apparatus are generally shown. Several embodiments of the technology are described generally in FIG. 1 through FIG. 8 to illustrate the characteristics and functionality of the apparatus and system. It will be appreciated that the methods may vary as to the specific steps and sequence and the systems and apparatus may vary as to structural details without departing from the basic concepts as disclosed herein. The method steps are merely exemplary of the order that these steps may occur. The steps may occur in any order that is desired, such that it still performs the goals of the claimed technology.

Generally, the apparatus enables the harvesting of electrical energy from energized conductors carrying alternating currents, such as those on overhead and underground power lines as well as power-supplying conductors found in offices and dwellings. The energy harvesting coil preferably has a rectangular shape with a long axis and a short axis. The long axis of the coil body is configured for placement adjacent and parallel to a long axis of a current carrying conductor.

The primary function of the energy harvester is to obtain enough power to supply wireless communication devices, energy storage batteries and capacitors, and sensors such as accelerometers, particulate matter measuring devices, and atmospheric sensors that measure concentrations of toxic gases and other substances. Although the apparatus is illustrated with a particular configuration to demonstrate the functionality of the system, the apparatus and methods can be adapted and applied to other settings and configurations.

Figure 1:
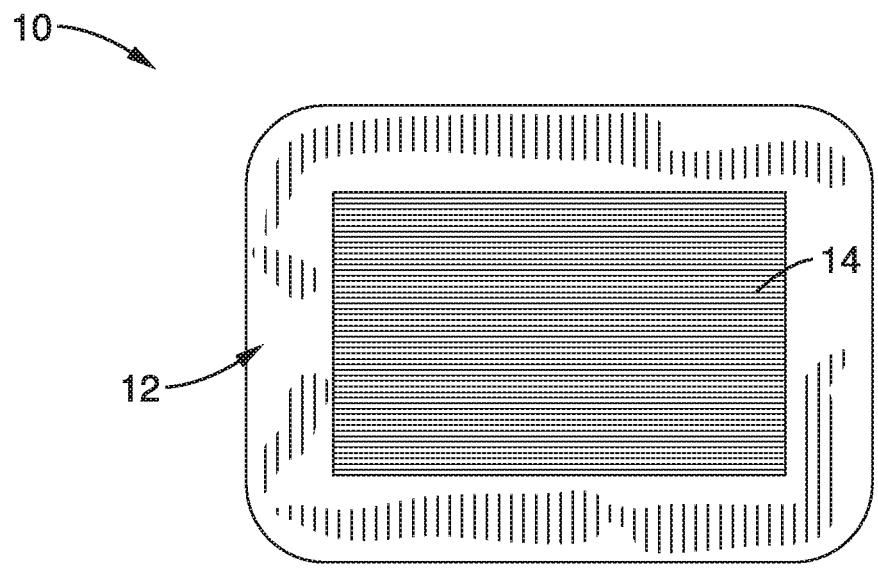
FIG. 1 is a schematic top view of an energy harvesting coil element according to an embodiment of the technology.
Figure 2:
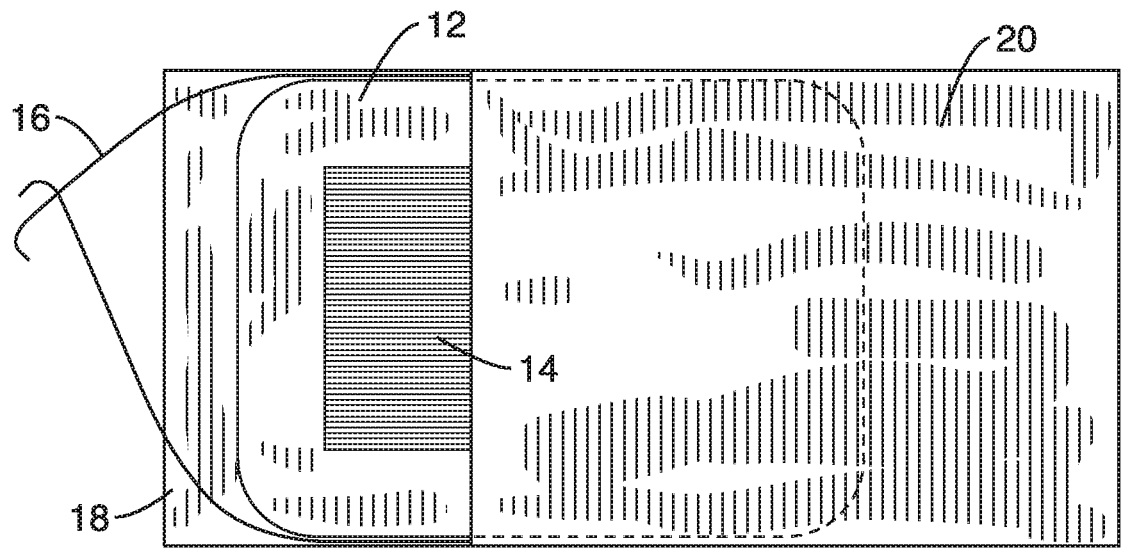
FIG. 2 is an illustration showing "flux grabber" sheets of electrical steel placed on both sides of the coil of FIG. 1 with the top sheet displaced to show the coil.

Turning now to FIG. 1 and FIG. 2, an induction coil configuration of one embodiment of the apparatus 10 for harvesting energy from a current carrying conductor is shown schematically. The induction coil shown in FIG. 1 has a rectangular shaped coil body 12 with a core 14 wrapped with multiple windings of at least one wire 16. In this embodiment, the energy harvesting coil comprises coil wire 16 wound on a non-magnetic form 12 with a ferromagnetic core 14. In one embodiment, the dimensions of the core 14 are about 3.5 inches by about 2.6 inches, and the coil thickness is about 0.75 inches.

The core 14 is preferably a laminate of sheets of high magnetic permeability steel. However, the core laminate can also be made of sheets of silicon steel, Permalloy™ or Metglas™ in other embodiments. The sheet thickness of the sheets forming the core 14 laminate in this embodiment is preferably between approximately 0.010 inches and approximately 0.015 inches. The laminated sheets of electrical steel are seen edge-on inside the coil form 12 forming the core 14 in FIG. 1.

In another embodiment, the harvesting coil comprises coil wire 16 wound on a non-magnetic form 12, producing an air-core coil.

The wire 16 can be made from any suitable conductor such as copper or aluminum and have a wide range of diameters. However, the preferred diameter of the wire 16 is within the range of approximately 0.0799 mm (40 gauge) and approximately 0.0812 mm (20 gauge).

The number of windings or turns of wire 16 around the body 12 can also have a wide range and the number is influenced by the dimensions of the coil body 12 and the gauge of the wire 16 that are selected. Typical coils preferably have windings numbering between approximately 1000 and approximately 10,000. The dimensions of the coil, wire and number of windings can also be optimized for magnetic flux produced with a particular power line current.

As shown in FIG. 2, at least one very thin sheet 18 of high magnetic permeability steel, commonly known as "electrical steel," is placed on the bottom surface of the coil body 12 and core 14 and at least one second thin sheet 20 of high magnetic permeability steel is placed on the top surface of the coil 12.

The sheets 18, 20 help to direct the time-varying magnetic flux produced by the AC current flowing in a supporting conductor into the coils 12. These steel sheets act as "flux grabbers" or "flux concentrators" to redirect the magnetic flux to interact more strongly with the coil 12, and so increase the coil's output voltage and power. The thickness of the sheets 18, 20 forming the flux concentrators in this embodiment is preferably between approximately 0.010 inches and approximately 0.015 inches.

FIG. 2 illustrates single "flux concentrator" sheets of electrical steel placed on both sides of the coil with its laminated internal core. The two sheets, each only 0.014 inches thick, attract enough time-varying magnetic flux to substantially increase the output of the coil. However, in other embodiments, multiple sheets 18, 20 can be used on the surfaces of the coils.

Figure 7:
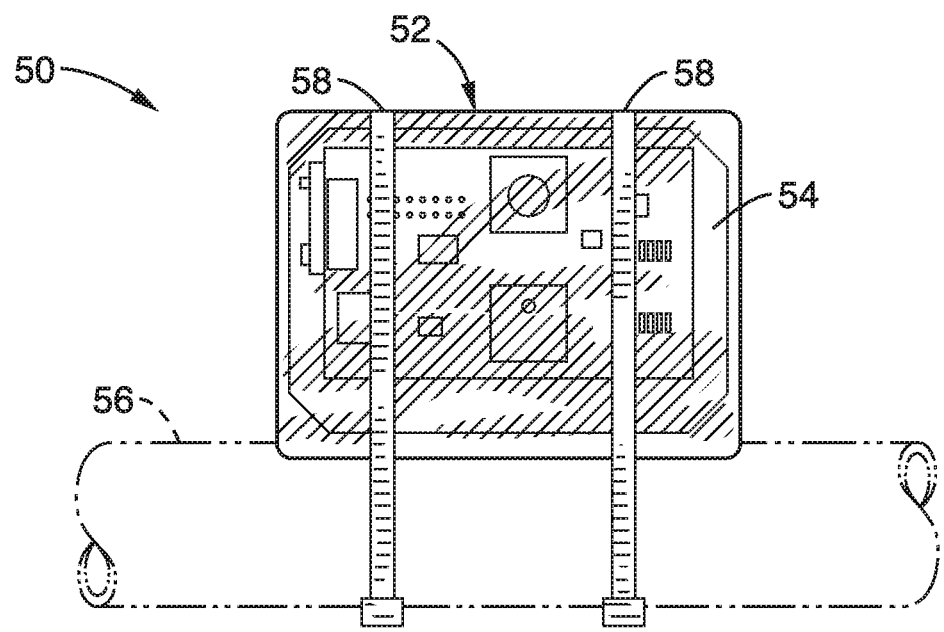
FIG. 7 shows the harvester coil, a PCB with two square commercial gas sensors with their associated circuitry (KWJ Engineering BTLE-DULPSM), and a radio chip (Texas Instruments CC2500) contained in an inexpensive transparent box that is attached with cable ties to a jacketed cable used for underground power distribution. Locating the antenna of the radio near the power line conductor has been found to substantially increase range of the radio.
Figure 8:
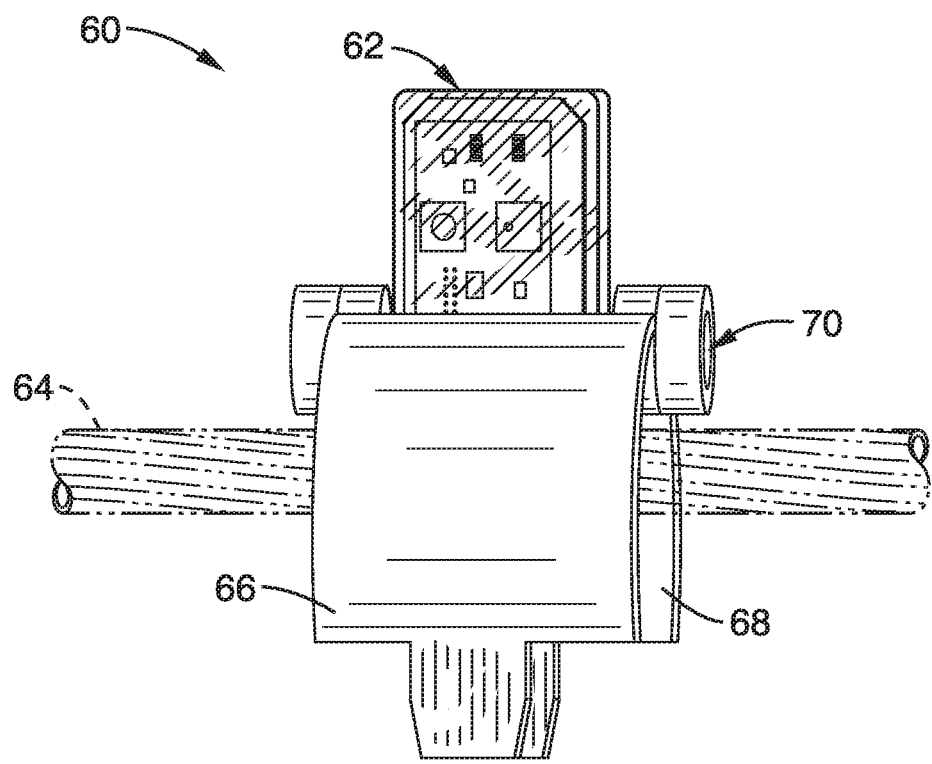
FIG. 8 shows the apparatus of FIG. 7 with a conductor and an oversized conceptual design for a clamp that could be used to fasten a harvester, sensors, and radio onto an operating overhead power distribution line.

The compact rectangular coil 12 is normally placed near a bare or insulator-covered overhead conductor wire carrying the power distribution current, which may typically amount to 50 or more root-mean-square amperes as illustrated in FIG. 7 and FIG. 8. It will be appreciated that power distribution lines may comprise two or perhaps three conductors made of stranded aluminum wires wound together, sometimes on a high-strength steel wire, resulting in a composite conductor whose outer diameter may range from about 0.375 inches to about 1.0 inches.

Typically one would mount the harvester and associated components 10 on just one conductor, or one could mount independent harvester/sensors on each of the conductors supported by a given pole in order to monitor the condition of each of the conductors at a given location. Since the harvesters are small and lightweight they could alternatively be mounted on the conductor some distance from a supporting pole. Since the separate conductors are at high potentials, such as on the order of 12,400 volts peak with respect to each other, each harvester would be mounted on only one of the power-line conductors at each location.

The sinusoidally time-varying currents in the power-line conductors produce time-varying magnetic fields that encircle the conductors. The rectangular coils are oriented with their long axes parallel to the axes of the conductors and so the magnetic fields are perpendicular to the broad area of each coil. In addition, it has been found experimentally that placing a sheet of electrical steel beneath the line conductor and near the coil further increases the output of the harvesters (See the curve labeled with "Coil+Core+2 grabbers+1 aux" in FIG. 5). For example, Table 1 summarizes measured outputs from coils with and without the electrical steel cores and flux concentrators.

Figure 3:
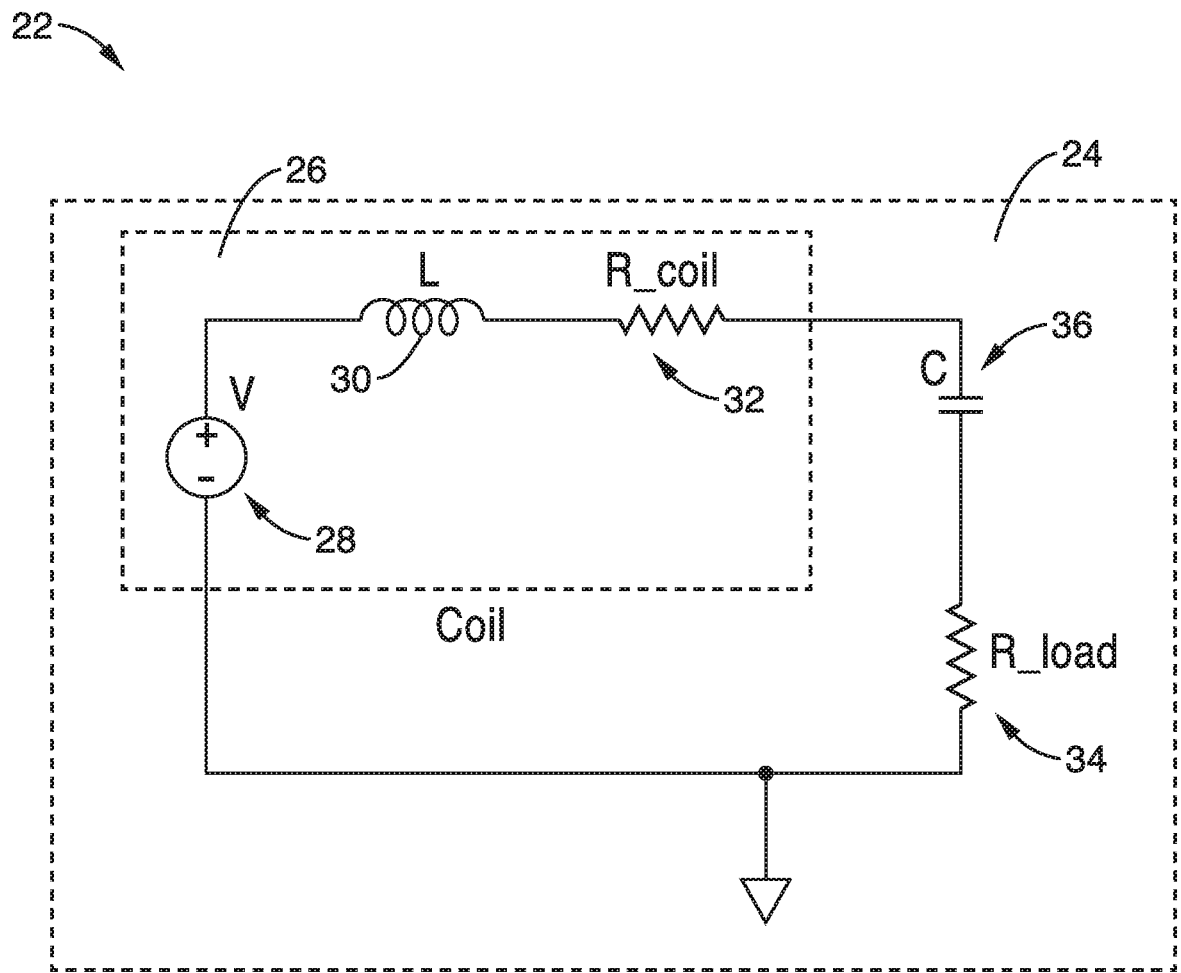
FIG. 3 is a Spice circuit embodiment showing (left side) the coil representation that includes a 60 Hz voltage source V, the response of the coil to the time-varying magnetic field produced by the power-line current, L the inductance of the coil, R_coil which represents the series resistance of the coil, a capacitor C external to the coil chosen to resonate at 60 Hz with inductance L in order to maximize the efficiency of the coil, and R_load, a resistor external to the coil.

A circuit 24 is associated with the coil 12 of the energy harvester 22 shown schematically in FIG. 3. The inside the dashed rectangle 24 labeled as "Coil" is the equivalent circuit of the coil itself, comprising the voltage 28 (V) produced by the time-varying magnetic flux interacting with the coil winding, the inductance 30 (L) of the coil, and the resistance 32 (R_coil) of the wire that has been wound to make the coil. The maximum output of circuit 24 is obtained across the external resistor 34 (R_load), where R_load equals R_coil, which is in series with capacitor 36 (C), which resonates with inductor 30 (L) at the frequency of operation.

At each of the power-line installations, one embodiment employs a commercial DC-DC converter integrated circuit whose input is the AC voltage from the flux-enhanced coil and whose output is a DC voltage used to continually charge batteries or supercapacitors whose stored energy supplies accelerometers, long-range radios to transmit data on local power-line conditions, and LEDs and buzzers that indicate local line conditions visually and audibly, and perhaps even power local Wi-Fi equipment.

Figure 4:
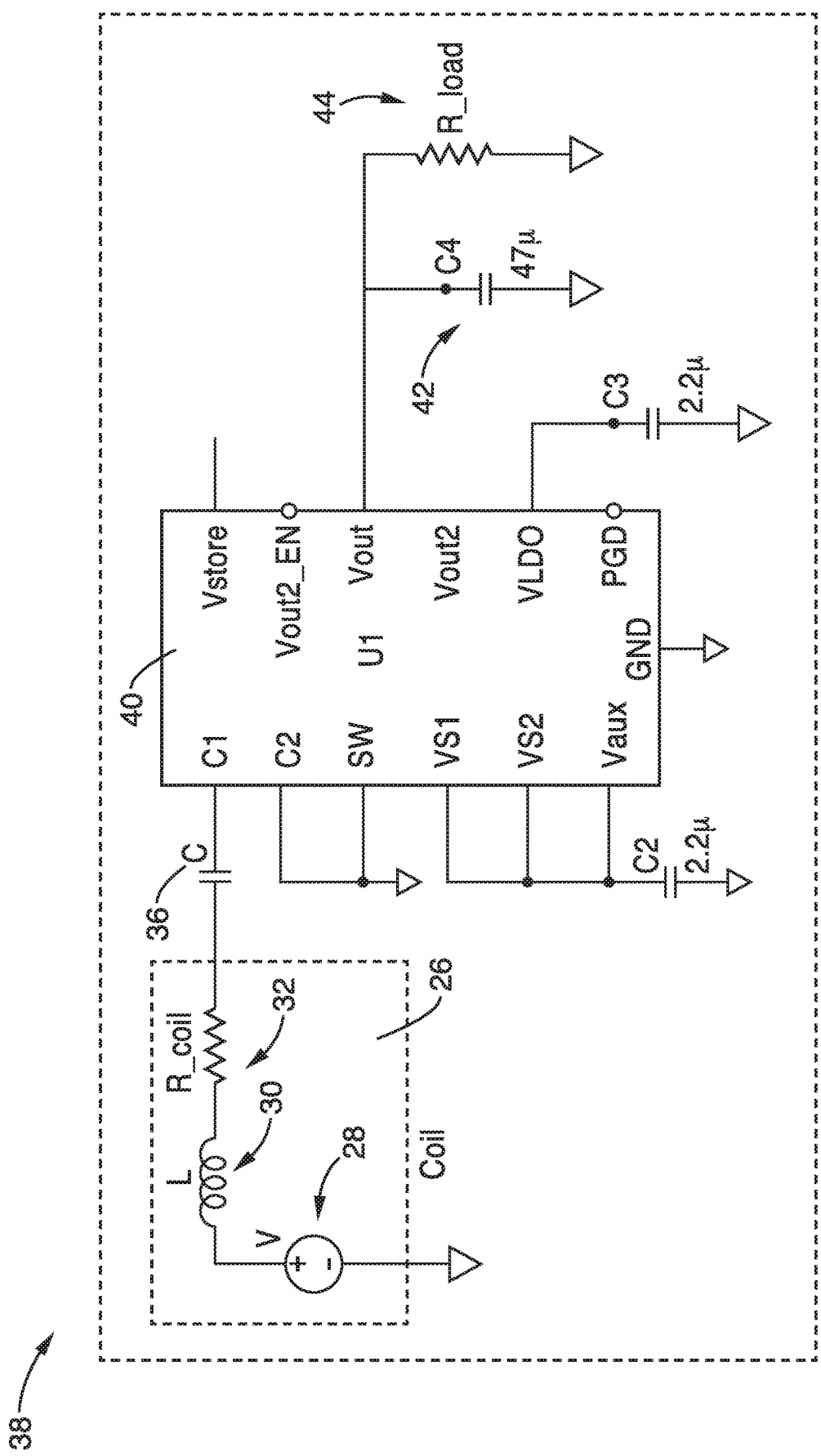
FIG. 4 is an alternative Spice circuit embodiment representing the coil and external capacitor C connected to terminal C1 of a typical commercial step-up voltage converter that produces a DC voltage at terminal Vout to power sensors, radios, other devices such as rechargeable batteries and supercapacitors. Note that after a power system outage occurs, the voltage converter automatically operates again shortly after the voltage at C1 returns.

Referring now to the embodiment shown schematically in FIG. 4, a spice circuit 38 is illustrated with the interior dashed rectangle 26 representing the coil connected to input terminal C1 of a commercial LTC3108 step-up voltage converter 40.

The coil representation 26 includes a 60 Hz voltage source which is the response of the coil to the time-varying magnetic field produced by the power-line current. The resistance 32 (R_coil) represents the series resistance of the coil and the inductance 30 (L) represents the inductance of the coil. Capacitor 36 (C) is chosen to resonate with inductance (L) in order to maximize the efficiency of the coil.

The AC voltage from the coil and its associated series resistor 32 and capacitor 36 appears at the input C1 of the LTC 3108 DC-DC converter 40. The useful output of the LTC 3108 (right side) is the DC voltage Vout. The capacitor 42 (C4) and resistor 44 (R_load) represent the batteries (or supercapacitors) that are charged by the coil and the LTC3108 integrated circuit 40.

The commercial LTC3108 step-up voltage converter illustrated in FIG. 4 can convert an input AC voltage of low magnitude, such as about 20 millivolts zero-to-peak, to a DC voltage at terminal $V_{out}$ as large as about 5 volts. Such an output could be used to power sensors and radios directly, as well as to power energy storage batteries and supercapacitors, as suggested by capacitor C4 and resistor R_load shown connected there. Other devices that might advantageously be powered include LEDs and buzzers that indicate local line conditions visually and audibly, sensors that measure air temperature, humidity, concentration of particulate matter, ambient gases, power line current and power line temperature, miniature cameras to monitor vegetation growth near the power line, and perhaps even power local Wi-Fi equipment.

The technology described herein may be better understood with reference to the accompanying examples, which are intended for purposes of illustration only and should not be construed as in any sense limiting the scope of the technology described herein as defined in the claims appended hereto.

Example 1

In order to demonstrate the operational principles of the apparatus and system, an energy harvester with a circuit shown generally in FIG. 4 with coils configured as shown generally in FIG. 2 was fabricated for testing.

One can model coils (e.g., with COMSOL) to find designs that maximize their open-circuit voltage, or that maximize their power output when the coil is loaded. Because flux condensers are coupled magnetically to the coil the coil's measured inductance will change, and therefore the optimum capacitance will change. The changing coil inductance that is observed upon testing can provide some indication of the effectiveness of a given flux condenser.

The coil that couples to the magnetic field produced by the powerline current (which, according to the Right-Hand Rule, encircles the current-carrying powerline conductor) can be made in three different ways. The first coil design was made by winding the wire of the coil on a non-magnetic form, producing an air-core coil.

To increase the output voltage of the coil, the second coil design supplied a ferromagnetic core whose internal magnetic field changes at the powerline frequency (50 Hz or 60 Hz). The preferred core material was "electrical steel" (also known as silicon steel), which is widely used in transformers. During manufacture, this steel was stressed in a linear direction parallel to its surface to maximize its magnetic permeability. The permeability of the sheet measured in the linear direction is typically $1500\mu_0$, which is the permeability of free space. The surfaces of the steel core strips forming the core are preferably coated with thin films of electrical insulating material which reduces the eddy current resistive losses of stacks of steel strips. Alternatively, other high-permeability core materials such as certain ferrites, Permalloy™, or Metglas™ could be used as flux grabbers.

The third and optimum approach for coil winding is to position such a coil structure with core of electrical steel sheets fastened together (e.g., with a very thin adhesive) for winding in a computer-controlled lathe where the form is held between sturdy plates on either side of the form to keep the two side grabbers planar and parallel as winding progresses. For maximum coil voltage output, the wires of successive layers (parallel thin insulated wires typically made of copper) should lie in the troughs between the wires of the layer underneath in order to maximize the winding efficiency of the winding.

Figure 6A:
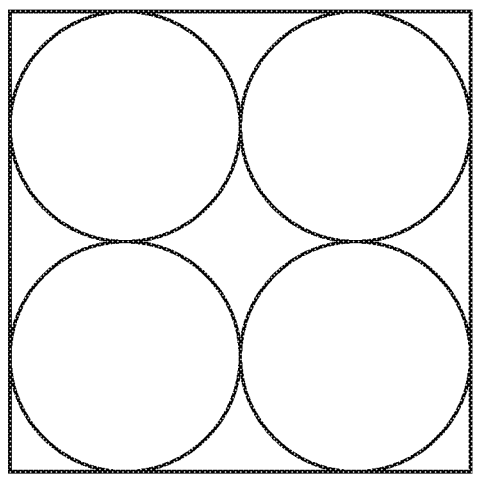
FIG. 6A and FIG. 6B illustrate two designs for winding coils, where the circles represent wires seen in cross-section, and the squares represent similar areas of the windings, thus illustrating that the density of wires inside the square on the right is greater than that on the left, which would result in a coil wound as on the right producing the larger output voltage.
Figure 6B:
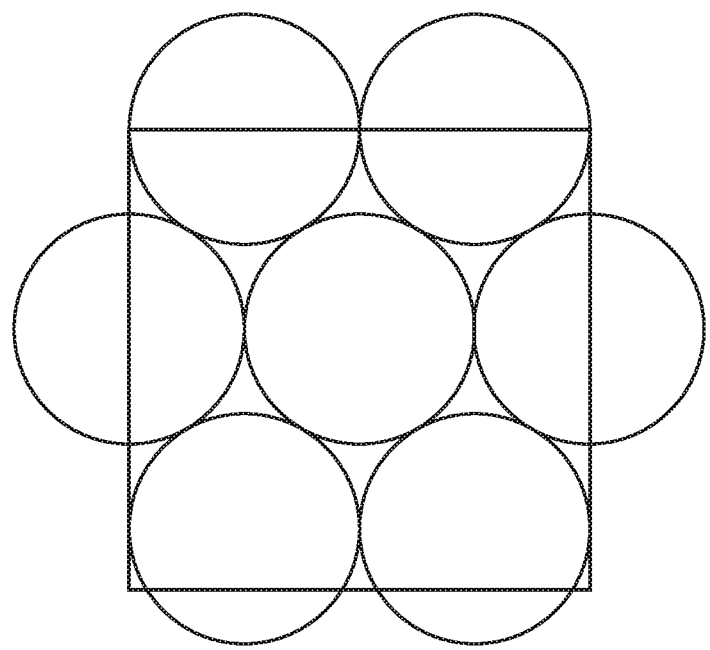

In FIG. 6A and FIG. 6B, two possible designs for winding coils are shown schematically, with the circles representing wires shown in cross-section, and the squares representing similar areas of the windings. It can be seen that the density of wires inside the square in FIG. 6B is greater than that in FIG. 6A, which would result in a coil wound as on the right producing the larger output voltage. This feature increased the fill factor from 0.785 to 0.907, which increased the coil output power by their ratio, the factor 1.16.

The harvester was tested by placing the coils near a length of power cable designed for use in underground power distribution systems. The ends of the center conductor of a ten-foot-long cable were connected to the terminals of the transformer from a soldering gun driven in turn by an adjustable transformer fed by a standard 60 Hz outlet. Currents in the cable were measured with a current transformer ("CT") coupled to the cable; the currents varied from a few amperes up to about 70 amperes RMS. The upper edge of the coil shown in FIG. 1 was placed in parallel with the axis of the cable and in contact with the cable jacket, and so was approximately one centimeter from the axis of the center conductor of the cable. Two coils, having either 1250 turns or 8000 turns were tested; the data below were obtained with the 1250-turn coil.

Figure 5:
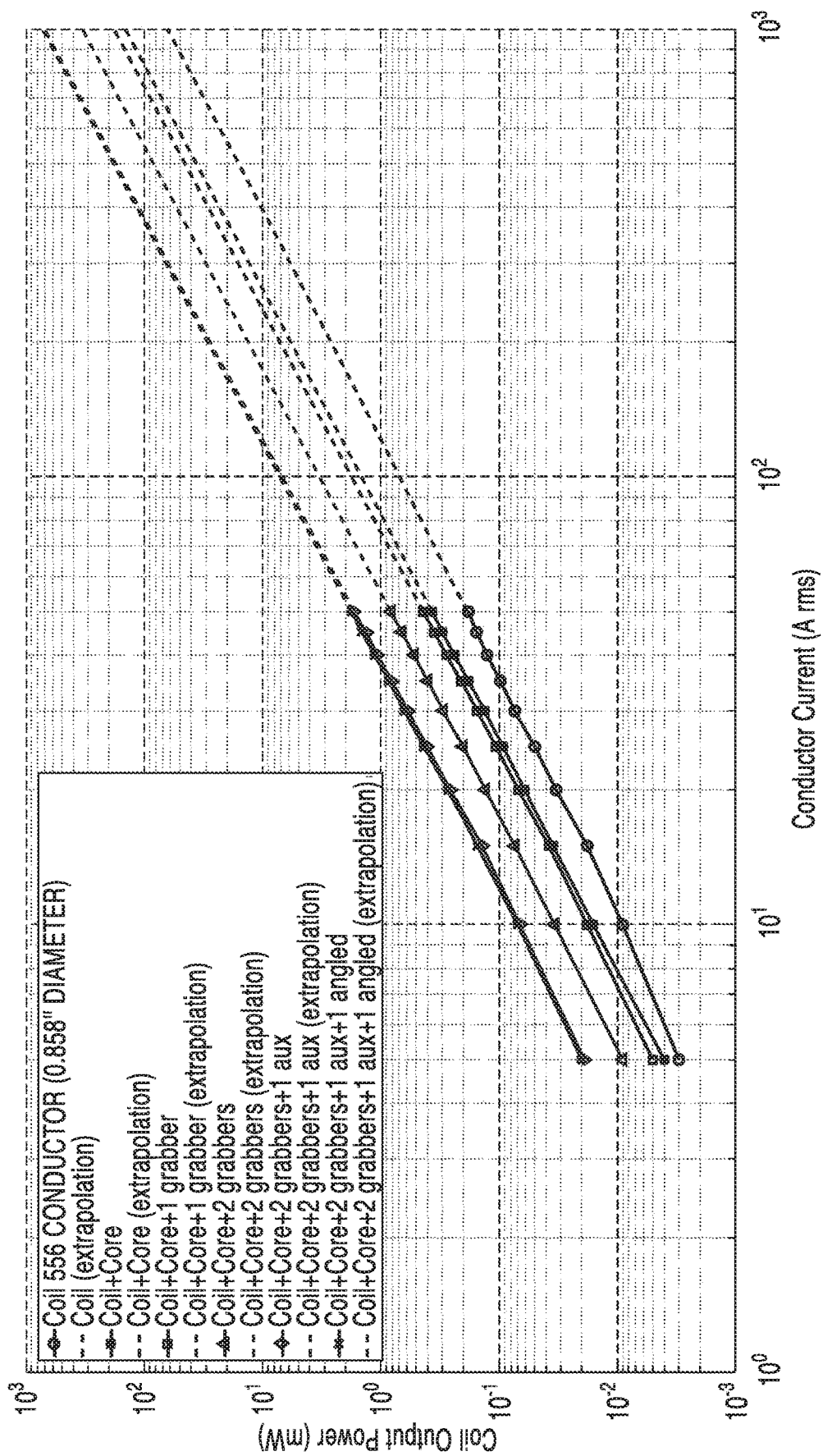
FIG. 5 is a log-log plot of measured and extrapolated powers obtainable from coils represented in FIG. 3 near which various flux grabbers have been located.

The advantage of using flux concentrators with a coil coupled to the magnetic field of a power line can be illustrated by comparing values from the plots of FIG. 5 with the results on the performance of a coil-based harvester without such additional magnetic field couplings. It can be seen that the highest measured power obtained with a wire wound on a flux concentrator next to a conductor carrying a 60 Hz current of 1,000 $A_{rms}$ was 257 milliwatts. In contrast, the conductor current for the harvester with several steel flux concentrators is extrapolated to deliver 700 milliwatts when the harvester coil is 1 cm from the conductor; when the harvester coil contacts the conductor the output power was 2.0 watts, a factor 7.8 times higher.

Tests performed with appropriately loaded coils also showed that the power output for the coil with a solid steel core was 1.0 milliwatts, and that for the same coil with a laminated core of electrical steel and 2 flux concentrators was 3.44 milliwatts, illustrating that the addition of the single sheets of the very thin sheets of steel over the faces of the coil substantially increase the output of the energy harvester.

It was also demonstrated that one can also increase the coupling between the power-line conductor and the harvester very simply by placing an additional sheet of magnetic material, such as electrical steel, directly beneath the power-line conductor (and possibly others near the coil). These sheets (coated with a weatherproofing polymeric material if needed) could significantly further increase the time-varying magnetic flux that can interact with the coil and hence increase the possible harvester output power. It was found that with three auxiliary flux concentrators an 8.88 milliwatt output was obtained from an optimally loaded coil when a 50 $A_{rms}$ power-line current was flowing. Since the coil's output voltage was proportional to the amplitude of the magnetic field and hence to the amplitude of the power-line current, the harvester output would be four times that (i.e. 36 milliwatts) with a current at 100 $A_{rms}$, which is the typical distribution power-line current. Table 1 summarizes measured outputs from coils with and without the electrical steel cores and flux concentrators.

Example 2

To further illustrate the apparatus and system, a printed circuit board with two commercial chemical vapor sensors along with a small radio chip to receive control signals and to transmit measured data. The harvester/sensor/radio embodiment is shown attached with conventional cable ties to a jacketed power distribution cable used for underground power distribution systems in FIG. 7 or to a typical bare aluminum overhead distribution power-line conductor in FIG. 8.

Since the harvester operates by coupling to the magnetic field near a current-carrying conductor, no ohmic contact need be made between the harvester and the conductor. Thus, the coil-based energy harvester, and sensors and communication devices associated with the harvester, could conveniently be contained in a weatherproof non-magnetic enclosure mounted near the conductor. As seen in the embodiment of FIG. 7 and FIG. 8, an inexpensive commercial plastic box was used to contain a harvester coil with a printed-circuit board.

As shown in FIG. 7, the energy harvester 50 had an enclosure 52 that housed the printed circuit board 54 and coil (not shown). The enclosure 52 is coupled to the power line 56 with a pair of plastic zip tie couplings 58. The long axis of the coil and housing is oriented parallel to the length of the powerline 56.

In an alternative embodiment 60 shown in FIG. 8, the energy harvester 60 has a weather proof enclosure 62 containing the circuit board, sensors and coil that is reversibly coupled to a clam shell type coupling. The coupling has two arms or leaves 66, 68 and a hinge 70. The leaves 66, 68 rotate to enclose the powerline 64 between them and the hinge 70 preferably locks to secure the coupling.

Installations in underground cable vaults or typical substations might be done safely with a standard tool such as an insulated hot stick together with the clamping device illustrated in FIG. 8, for example. For work on energized overhead power lines the use of an elevated insulated platform carrying a human installer is standard practice.

An alternative rapid and much less expensive installation technique in the case of the small devices involved here is to use a small remotely-controlled drone to carry the equipment up to the power line. The drone might carry a robotic tool to fasten cable ties on the conductor, or a mechanical clamp that closes when the drone brings it into mechanical contact with the conductor might be employed similar to that shown in FIG. 8. The procedure would satisfy recent FAA regulations that the drone elevation not exceed 400 feet and that the drone be visible at all times.

One could use a mechanical device that clamps automatically onto the powerline conductor when the drone brings it into contact with the conductor. FIG. 8 shows a tool that was originally designed and fabricated to probe underground jacketed power cables which approximates one that could be used with a drone to attach the package shown on overhead power lines. A device designed specifically for this purpose would be much smaller than what is shown in FIG. 8 for testing, and a locking clasp would be attached to the "leaves" of the device. The transparent box 62 could fit into the gap near the tool's hinge, so that the harvester coil would be brought nearly into contact with the conductor, and a locking clasp could be attached to one of the open leaves of the clamp. While sitting on the ground with the clamp's hinge supported by the drone and its two leaves 66, 68 opened upward, the harvester package would be set down onto the clamp. The drone would then fly up to the conductor from below and move upward with the two leaves of the clamp being positioned on either side of the conductor. This would cause the upper winding of the coil package to come into physical contact with the conductor and cause the clamp to close and hold the harvester against the bottom of the conductor for maximum magnetic field coupling. A latch at the top of the clamp would close, after which the drone would descend from below the conductor, leaving the harvesting/sensing equipment installed and operating.

Additionally, it might be desirable to silence the continuously powered radio or to remove the equipment from the power-line entirely. This could be accomplished in several ways. Silencing the radio could be done remotely via a suitably coded transmission broadcast to the apparatus.

For removal, if cable ties were employed, a properly outfitted drone could cut mechanically or even melt through the tie(s), catch the package, and bring it back for disposal or re-use. With the clamp described, a drone could activate a latch that releases the installed package and permit its return.

The energy harvesters described herein can be used in various applications and embodied in various ways which readily be understood by those skilled in art, including, but not limited to, the following:

In one embodiment, the apparatus can be configured to detect power theft. Theft of power from overhead distribution lines is said to be common. Since the energy harvester can also serve as a current sensor, pairs of harvesters (or co-located current sensors) could measure the power entering an area and that leaving the area. Comparing the sum of the powers paid for by customers in that area with the decrease of power as measured will pin-point the location of power theft for further investigation.

In another embodiment, the devices can be configured for use with power substations. For example, the harvesters can be used on conductors in power substations where they can be mounted on exposed or insulated conductors as inexpensive means for obtaining modest amounts of power (milliwatts to watts) to supply sensors, lights, security cameras, wireless radios, and other devices. Such use of these harvesters would be very inexpensive in comparison with more complicated means for providing power in various substation locations for such applications.

The harvesters (together with desired sensors) can also be used with insulated underground power-lines, as are found in many power distribution systems located in residential and industrial areas. For example, a vault beneath a city sidewalk may contain an AA-battery-powered indicator light that can be seen through the cover of the vault. The light would turn on to indicate a fault condition inside the vault; powering the indicator with the energy harvester instead would eliminate the expensive need for periodic battery replacement. A harvester in such a vault could also power gas sensors that might indicate the presence of dangerous gasses in the vault.

At first glance it might seem that using these harvesters on conventional jacketed underground power cables may not be possible, since such cables have, in addition to the central conductor, wires known as concentric neutrals located outside an insulator on the center conductor that carry return currents whose instantaneous flow direction is always opposite to that of current in the central conductor. Thus, the direction of the magnetic fields produced by current flow in the concentric neutrals is opposite to that of the fields produced by current flow in the center conductor, perhaps causing the harvester to be useless. However, laboratory tests showed that the harvester does work on cables designed for underground use, presumably because of the different distributions of the magnetic fields from the central conductor and the many small-diameter concentric neutrals.

Harvested power can also be used with continuous pole sensor monitoring and transmission applications. The millions of overhead power distribution lines on poles in the U.S. can be locations for installing powered environmental sensors. Power line mounted sensors can be used for measuring the concentrations of airborne particulate matter such as diesel exhaust and smoke, as well as toxic gases, greenhouse gases, allergenic pollens, etc. At present, in the U.S. there are fewer than approximately 1000 accurate particulate matter sensors, and they have been typically large, heavy and costly. Power-line-mounted wirelessly-enabled atmospheric sensors are feasible, and relatively inexpensive. If networked they could provide data for tracking the movements of clouds of particles and harmful gases. They could be powered whenever the power lines are powered, i.e., virtually continuously. Compact, inexpensive, energy-efficient sensors that require only milliwatt or microwatt powers now exist. In the interest of protecting human health, modest governmental subsidies to the power companies might provide the funds for manufacturing and installing the sensor/harvesters and disseminating the data they furnish. Alternatively, organizations interested in obtaining atmospheric information might pay power companies for the right to locate atmospheric sensors on their power lines.

In another embodiment, the sensors are located at lower heights than the power transmission lines and are separate from the energy source. In some settings, the measurement of atmospheric conditions or quantities at a height of over 20 feet above pedestrian pathways, where power distribution power-lines are located, might not provide relevant data indicative of threats to human health. In this embodiment, the energy harvesters on the overhead lines are used to supply the power to head-height sensors and perhaps radio transmitters.

Since it could be dangerous to run electrical wiring from a harvester located near high-voltage lines down to a sensor located on the pole at human head height, in this embodiment an energy harvester on an overhead distribution power-line could power an optical transmitter (e.g., a light-emitting diode) that feeds a fiber-optic guide attached to the power-line pole to transmit energy optically down to a head-height installation on the pole that employs a tiny solar-cell to convert the optical energy to electrical energy to power co-located atmospheric sensors there. Measurement results can be transmitted optically or via a radio chip up the power pole supporting the power-line where a radio transmits the data obtained to a community database, the Internet, and to cell phones.

From the description herein, it will be appreciated that that the present disclosure encompasses multiple embodiments which include, but are not limited to, the following:

1. An apparatus for harvesting power from a current carrying conductor without electrically contacting the conductor, the apparatus comprising: (a) an energy harvesting coil having first and second faces, the coil having an output; (b) a first flux condenser adjacent to the first face of the energy harvesting coil; (c) a second flux condenser adjacent to the second face of the energy harvesting coil; (d) a voltage converter having an input and an output; (e) the input of the voltage converter connected to the output of the energy harvesting coil; and (f) the output of the voltage converter connected to an energy storage device; (g) wherein captured energy from magnetic flux from a current carrying conductor is stored in the energy storage device.

2. The apparatus of any preceding or following embodiment, wherein the coil further comprises a core of laminated strips of high magnetic permeability steel.

3. The apparatus of any preceding or following embodiment: wherein the coil further comprises a rectangular shape with a long axis and a short axis; and wherein the long axis is configured for placement adjacent and parallel to a long axis of a current carrying conductor.

4. The apparatus of any preceding or following embodiment, wherein the first and second flux condensers each comprises at least one thin sheet of a high magnetic permeability steel.

5. The apparatus of any preceding or following embodiment, further comprising: a housing enclosing the coil, flux condensers and voltage converter; and at least one coupling configured to couple the housing to a current carrying conductor; wherein the housing is oriented radially from a long axis of the current carrying conductor.

6. The apparatus of any preceding or following embodiment, wherein the coupling comprises: a first arm; a second arm; and a hinge mounted to the first arm and to the second arm; wherein the first arm can move with respect to the second arm axially about the hinge.

7. The apparatus of any preceding or following embodiment, wherein the coupling comprises one or more zip ties.

8. The apparatus of any preceding or following embodiment, further comprising: a sensor having a power input connected to the energy storage device; and a radiofrequency transmitter having a data input; the sensor having a data output connected to the data input of the radiofrequency transmitter.

9. The apparatus of any preceding or following embodiment, further comprising a controller configured to control the sensors, transmitter and storage device.

10. An apparatus for harvesting power from a current carrying conductor without electrically contacting the conductor, the apparatus comprising: (a) an energy harvesting coil having first and second faces, the coil having an output; (b) a first flux condenser adjacent to the first face of the energy harvesting coil; (c) a second flux condenser adjacent to the second face of the energy harvesting coil; (d) a step-up voltage converter having an input and an output; (e) the input of the step-up voltage converter connected to the output of the energy harvesting coil; (f) a sensor having a power input connected to the output of the step-up voltage converter; and (g) a radiofrequency transmitter having a data input; (h) the sensor having a data output connected to the data input of the radiofrequency transmitter.

12. The apparatus of any preceding or following embodiment, wherein the sensor is selected from the group of sensors consisting of atmospheric gas sensors, temperature sensors, relative humidity sensors, atmospheric pressure sensors, particulate sensors, and accelerometers.

13. The apparatus of any preceding or following embodiment, further comprising an energy storage device connected to the output of the step-up voltage converter.

14. The apparatus of any preceding or following embodiment, wherein the first and second flux condensers each comprises at least one thin sheet of a high magnetic permeability steel.

15. The apparatus of any preceding or following embodiment, wherein the energy harvesting coil has a rectangular shape with a long axis; and wherein the long axis is configured for placement adjacent and parallel to a long axis of the current carrying conductor.

16. The apparatus of any preceding or following embodiment, wherein the energy harvesting coil comprises coil wire wound on a non-magnetic form, producing an air-core coil.

17. The apparatus of any preceding or following embodiment, wherein the energy harvesting coil comprises coil wire wound on a ferromagnetic core.

18. The apparatus of any preceding or following embodiment, wherein the ferromagnetic core comprises a laminate of strips of material selected from the group of materials consisting of a high magnetic permeability steel, silicon steel, Permalloy™, and Metglas™.

19. The apparatus of any preceding or following embodiment, further comprising: a housing enclosing the coil, flux condensers and voltage converter; and at least one coupling configured to couple the housing to a current carrying conductor; wherein the housing is oriented radially from a long axis of the current carrying conductor.

20. An apparatus for harvesting power from a current carrying conductor without electrically contacting the conductor, the apparatus comprising: (a) a rectangular energy harvesting coil having first and second faces and a long axis, the coil having an output; (b) a first flux condenser adjacent to the first face of the energy harvesting coil; (c) a second flux condenser adjacent to the second face of the energy harvesting coil; (d) a step-up voltage converter having an input and an output; (e) the input of the step-up voltage converter connected to the output of the energy harvesting coil; and (f) the output of the step-up voltage converter connected to an energy storage device; (g) at least one sensor having a power input connected to the energy storage device; (h) a radiofrequency transmitter having a data input; (i) the sensor having a data output connected to the data input of the radiofrequency transmitter; (j) a controller operably coupled to the voltage converter, energy storage device, sensors and transmitter; (k) a housing enclosing the coil, flux condensers and voltage converter; and (l) at least one coupling configured to couple the housing to a current carrying conductor; (m) wherein captured energy from magnetic flux from a current carrying conductor is stored in the energy storage device.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

As used herein, the term "set" refers to a collection of one or more objects. Thus, for example, a set of objects can include a single object or multiple objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

In the claims, reference to an element in the singular is not intended to mean "one and only one" unless explicitly so stated, but rather "one or more." All structural, chemical, and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE 1

| Measured Performances | |
|---|---|
| A. Coil With No Core: | |
| Output voltage unloaded | 0.80 volts 0-to-peak |
| Output voltage unloaded | |
| With one flux concentrator | 0.86 |
| With two flux concentrators | 0.90 |
| B. Coil With Solid Steel Core: | |
| Output voltage unloaded | 0.96 |
| With one flux concentrator | 1.20 |
| With two flux concentrators | 1.50 |
| C. Coil With Laminated Electrical Steel Core | |
| Output voltage unloaded | 1.08 |
| With one flux concentrator | 1.27 |
| With two flux concentrators | 1.78 |

What is claimed is:

1. An apparatus for harvesting power from a current carrying conductor without electrically contacting the conductor, the apparatus comprising:
    (a) an energy harvesting coil having first and second faces, the coil having an output;
    (b) a first flux condenser adjacent to the first face of the energy harvesting coil;
    (c) a second flux condenser adjacent to the second face of the energy harvesting coil; and
    (d) a voltage converter having an input and an output;
    (e) the input of the voltage converter connected to the output of the energy harvesting coil; and
    (f) the output of the voltage converter connected to an energy storage device;
    (g) wherein captured energy from magnetic flux from a current carrying conductor is stored in the energy storage device.

2. The apparatus of claim 1, wherein the coil further comprises a core of laminated strips of high magnetic permeability steel.

3. The apparatus of claim 1:
    wherein the coil further comprises a rectangular shape with a long axis and a short axis; and
    wherein the long axis is configured for placement adjacent and parallel to a long axis of a current carrying conductor.

4. The apparatus of claim 1, wherein said first and second flux condensers each comprises at least one thin sheet of a high magnetic permeability steel.

5. The apparatus of claim 1, further comprising:
    a housing enclosing the coil, flux condensers and voltage converter; and
    at least one coupling configured to couple the housing to a current carrying conductor;
    wherein the housing is oriented radially from a long axis of the current carrying conductor.

6. The apparatus of claim 5, wherein the coupling comprises:
    a first arm;
    a second arm; and
    a hinge mounted to said first arm and to said second arm;
    wherein said first arm can move with respect to said second arm axially about said hinge.

7. The apparatus of claim 5, wherein the coupling comprises one or more zip ties.

8. The apparatus of claim 1, further comprising;
    a sensor having a power input connected to the energy storage device; and a radiofrequency transmitter having a data input;

the sensor having a data output connected to the data input of the radiofrequency transmitter.

9. The apparatus of claim 8, further comprising a controller configured to control the sensors, transmitter and storage device.

10. An apparatus for harvesting power from a current carrying conductor without electrically contacting the conductor, the apparatus comprising:
 (a) an energy harvesting coil having first and second faces, the coil having an output;
 (b) a first flux condenser adjacent to the first face of the energy harvesting coil;
 (c) a second flux condenser adjacent to the second face of the energy harvesting coil;
 (d) a step-up voltage converter having an input and an output;
 (e) the input of the step-up voltage converter connected to the output of the energy harvesting coil;
 (f) a sensor having a power input connected to the output of the step-up voltage converter; and
 (g) a radiofrequency transmitter having a data input;
 (h) the sensor having a data output connected to the data input of the radiofrequency transmitter.

11. The apparatus of claim 10, wherein the sensor is selected from the group of sensors consisting of atmospheric gas sensors, temperature sensors, relative humidity sensors, atmospheric pressure sensors, particulate sensors, and accelerometers.

12. The apparatus of claim 10, further comprising an energy storage device connected to the output of the step-up voltage converter.

13. The apparatus of claim 10, wherein said first and second flux condensers each comprises at least one thin sheet of a high magnetic permeability steel.

14. The apparatus of claim 10:
 wherein the energy harvesting coil has a rectangular shape with a long axis; and
 wherein the long axis is configured for placement adjacent and parallel to a long axis of the current carrying conductor.

15. The apparatus of claim 10, wherein the energy harvesting coil comprises coil wire wound on a non-magnetic form, producing an air-core coil.

16. The apparatus of claim 10, wherein the energy harvesting coil comprises coil wire wound on a ferromagnetic core.

17. The apparatus of claim 16, wherein the ferromagnetic core comprises a laminate of strips of material selected from the group of materials consisting of a high magnetic permeability steel, silicon steel, Permalloy™, and Metglas™.

18. The apparatus of claim 10, further comprising:
 a housing enclosing the coil, flux condensers and voltage converter; and
 at least one coupling configured to couple the housing to a current carrying conductor;
wherein the housing is oriented radially from a long axis of the current carrying conductor.

19. An apparatus for harvesting power from a current carrying conductor without electrically contacting the conductor, the apparatus comprising:
 (a) a rectangular energy harvesting coil having first and second faces and a long axis, the coil having an output;
 (b) a first flux condenser adjacent to the first face of the energy harvesting coil;
 (c) a second flux condenser adjacent to the second face of the energy harvesting coil;
 (d) a step-up voltage converter having an input and an output;
 (e) the input of the step-up voltage converter connected to the output of the energy harvesting coil; and
 (f) the output of the step-up voltage converter connected to an energy storage device;
 (g) at least one sensor having a power input connected to the energy storage device;
 (h) a radiofrequency transmitter having a data input;
 (i) the sensor having a data output connected to the data input of the radiofrequency transmitter;
 (j) a controller operably coupled to the voltage converter, energy storage device, sensors and transmitter;
 (k) a housing enclosing the coil, flux condensers and voltage converter; and
 (l) at least one coupling configured to couple the housing to a current carrying conductor;
 (m) wherein captured energy from magnetic flux from a current carrying conductor is stored in the energy storage device.

* * * * *